United States Patent Office 3,156,397
Patented Nov. 10, 1964

3,156,397
CONTROL OF STRIP DRIVING MEANS
Richard Edward Davies, Rugby, England, assignor to Associated Electrical Industries Limited, London, England, a British company
Filed Apr. 27, 1962, Ser. No. 190,678
Claims priority, application Great Britain May 2, 1961
3 Claims. (Cl. 226—42)

This invention relates to the drive control of strip material, especially electrically conducting strip, a portion of which is supported to form a catenary. In many cases, such as when metal strip is moved continuously to undergo treatment, in a furnace for instance, or to be coiled on, or uncoiled from a reel, it is necessary to maintain constant the length of a catenary strip portion suspended freely between supports over which the strip moves. The actual driving means can be provided, for instance, by one, or preferably two pairs of rollers which may form the said supports, or other means which frictionally contact the strip at a point or points outside the catenary portion between the two supports, which may be idling rollers.

If, for instance, two drives impart to points of the strip before and after the catenary two speeds which are not accurately equal, or are not related to correspond to a variation in strip length, as caused by heat expansion for instance, an integrating error results so that the deviation of the catenary from its normal shape increases with time.

The present invention aims at a means for influencing an electric control circuit in direct response to such integrating catenary error. For comparatively slow strip movement, a control according to the invention may suffice to maintain a predetermined catenary shape, but for rapid strip movement the invention can be readily combined with means sensitive to the difference in speeds at both ends of the catenary, or speed rate change. Then a conventional control means may operate in response to the relationship between the speeds of two motors driving the strip before and after the catenary portion, while the control according to the invention is dependent directly upon the shape of the catenary portion, which may change, even at equal motor speeds, if two driving rollers coupled to the said motors have slightly different diameters.

From a general aspect the invention resides in a circuit arrangement for controlling the drive of electrically conducting strip which has a portion suspended to form a catenary curve, wherein an electrically conducting member is situated in the vicinity of the said portion, the portion and member forming electrodes of a capacitor, and the capacitor being connected to a circuit controlling the drive of the strip so as to maintain a predetermined shape and length of the said catenary portion.

From another aspect the invention resides in an arrangement for controlling the relative speed of two electric motors which drive a strip of electrically conducting material at one and the other end respectively of a catenary portion of the strip, comprising a circuit controlling the speed of one of the motors, said circuit including an amplifier and a capacitor in a feedback connection of the amplifier, one of the electrodes of said capacitor being formed by said catenary portion.

Advantageously the control circuit includes a bridge of the Wayne-Kerr type, and the capacitor is connected in the feedback path of an amplifier of the bridge.

In a preferred embodiment strip portions near the two ends of the catenary are driven by electric motors supplied from a common source one of the two motors being controlled in dependence upon both the speed error of the two motors and an error signal derived from the bridge output. The two motors may form part of a Ward-Leonard set, so that they are fed from a common D.C. generator. Then an additional generator is arranged in series with one of the two motors, and is controlled, e.g. by field control in dependence upon the speed error between the two driving motors and the deviations of the catenary from a normal shape. An amplifier determining the field excitation can be responsive to one control signal representing the difference of the two motor speeds, and to another control signal derived from the output of the Wayne-Kerr bridge.

More details will become apparent and the invention will be better understood from the following description referring to the accompanying drawings, in which.

Figure 1:
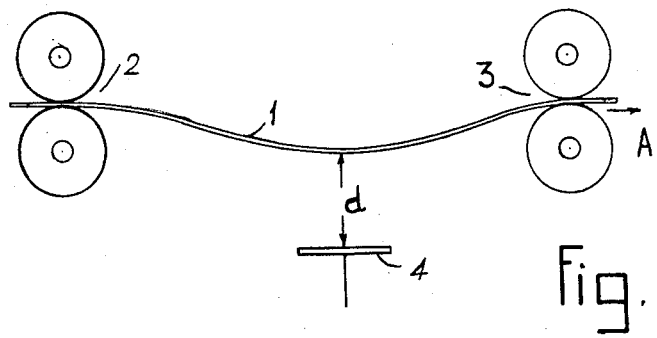
FIG. 1 shows diagrammatically a strip portion suspended between two pairs of rollers to form a catenary curve.

Referring to FIG. 1, a strip 1 of electrically conducting material, steel for instance, is suspended between two pairs of rollers denoted 2, 3, which are individually driven to move the strip in the direction of the arrow A. A plate 4 of electrically conducting material is arranged in the vicinity of the catenary. Both the strip 1 and the plate 4 are electrically connected (not shown) to form a capacitor, the air in the space therebetween constituting the dielectric of the capacitor. The capacitance value is inversely proportionate to the distance $d$, therefore it changes with the length of the catenary strip portion. In order to avoid undesired coupling to near metal parts a guard ring can be provided, particularly around the plate 4, and the dielectric coefficient can be maintained as constant as desired, for instance by controlling the humidity of the air between the electrodes.

Figure 2:
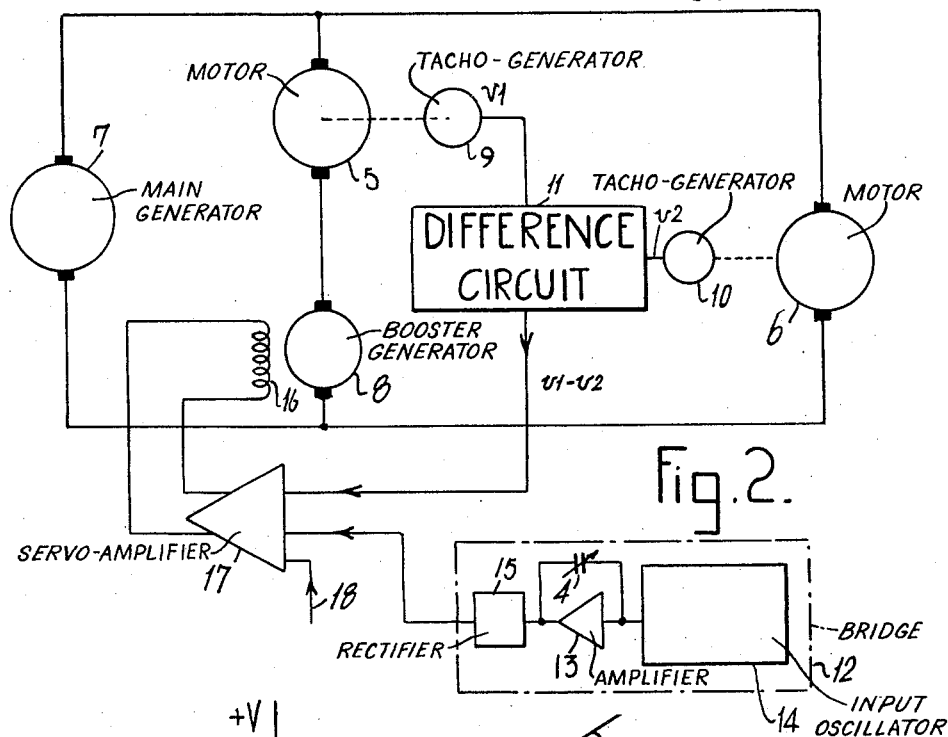
FIG. 2 shows diagrammatically and by way of example a circuit arrangement embodying the invention.

FIG. 2 shows electric motors 5, 6, driving the roller pairs 3, 2. A Ward-Leonard set may be used. The motors are supplied from a common main generator 7. A direct current additional or booster generator 8 is connected in series with the motor 5 which drives the roller pair 3. Tacho-generators 9, 10 are coupled to the motors 5, 6 and provide output signals representing their speeds. A circuit 11 is provided to produce an error signal proportionate to the difference $v1-v2$ of the speeds of the motors 5, 6.

A Wayne-Kerr bride, generally denoted 12, comprises an amplifier 13, an input oscillator 14, and an output rectifier 15. A feedback signal from the amplifier output to its input is passed through the capacitor 4 whose value depends upon the catenary strip portion.

A field winding 16 of the booster generator 8 is supplied from a servo amplifier 17 receiving control signals from the difference circuit 11 and bridge 12. In order to maintain a certain distance $d$ at zero speed of the strip servo-amplifier 17 is also connected through a lead 18 to a bias voltage which opposes the output from the bridge 12.

Assume that the catenary loop increases, then the distance $d$ decreases, the capacitance of 4 increases, the output from the bridge 12 causes via amplifier 17 increases in the excitation and output of the booster generator 8, and the speed of motor 5 increases until the loop shape as defined by the distance $d$ is returned to normal.

Alternatively the speed of motor 6 driving the roller pair 2 can be controlled in accordance with the invention. Then, of course, the operation is inverse as the speed of motor 6 must be reduced to restore the catenary and distance $d$ to normal.

Figure 3:
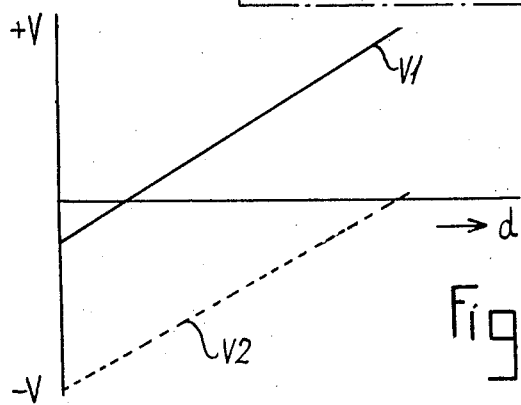
FIG. 3 shows charactertistics explaining the operation of the invention.

As can be seen from FIG. 3 the arrangement according to the invention can provide either for increase or decrease of signal strength in response to a given change of the distance $d$. If an increase in positive voltage is required with increase of $d$ a straight linear characteristic V1 is provided for. If the opposite relationship is required then the characteristic corresponds to curve V2, representing a decrease of negative voltage with increase in $d$. However, by changing the circuit connections a voltage bucking instead of boosting of opposite sign can be used as required.

Variations are possible without departing from the invention. In lieu of one of the two driven roller pairs shown, a reel may be used and may be driven for winding, or unwinding of the strip. Then a conventional part of the motor control is also responsive to the change in diameter of the coiled strip portion on the reel. Other control means known per se can be used in conjunction with the invention without affecting the operation of the latter as it is based not on speed relationship but on the thickness of the dielectric of a capacitor formed by a catenary strip portion and a stationary member.

Where the loop shape is a "deep" catenary with approximately vertical side portions, two plates arranged parallel to each other outside the bight of the catenary and extending lower down than the bight, can form the electrode 4, or can be used as terminal electrodes of the capacitor, with the catenary portion of the strip coextensive with the plates constituting an intermediary electrode.

What I claim is:

1. An arrangement for controlling the sag of a catenary length of a travelling conducting material, comprising two electric motors coupled in driving relationship to the two ends of said length, both motors having their armatures supplied from a common direct current source, a direct current booster generator having an armature connected in series with the armature of one of said two motors, a field winding of said booster generator being supplied from a rectifier which is fed from an oscillator through an amplifier, said amplifier having a feedback circuit and a capacitor having an electrode formed by the said length of material being included in said feedback circuit.

2. An arrangement as claimed in claim 1, including two tacho-generators producing signals which represent simultaneous speeds of the two motors, a circuit producing a signal which is a measure of the difference between said two speed signals, also including a servo-amplifier, said servo-amplifier being controlled by said difference signal and by the output from the said rectifier, the output from the servo-amplifier being connected to supply the field winding of the said direct current booster generator.

3. An arrangement as claimed in claim 1, wherein the common direct current source comprises the generator of a Ward-Leonard set.

References Cited in the file of this patent

UNITED STATES PATENTS

| | | |
|---|---|---|
| 2,512,372 | Pakala | June 20, 1950 |
| 2,678,174 | Wilson | May 11, 1954 |
| 2,877,397 | Poschner et al. | Mar. 10, 1959 |
| 3,046,411 | Steiner | July 24, 1962 |

FOREIGN PATENTS

| | | |
|---|---|---|
| 782,776 | Great Britain | Sept. 11, 1957 |